US007839354B2

(12) United States Patent  
Moriwaki

(10) Patent No.: US 7,839,354 B2
(45) Date of Patent: Nov. 23, 2010

(54) IMAGE DISPLAY SYSTEM, HOST MACHINE AND RECORDING MEDIUM FOR STORING PROGRAM

(75) Inventor: Kagumi Moriwaki, Kawanishi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 834 days.

(21) Appl. No.: 11/801,873

(22) Filed: May 11, 2007

(65) Prior Publication Data

US 2007/0268203 A1 Nov. 22, 2007

(30) Foreign Application Priority Data

May 17, 2006 (JP) ............................. 2006-137509
Apr. 17, 2007 (JP) ............................. 2007-108005

(51) Int. Cl.
G09G 5/00 (2006.01)
(52) U.S. Cl. ........................... 345/1.1; 345/1.2; 345/2.2
(58) Field of Classification Search ........... 345/1.1–1.3, 345/2.1–2.3, 156; 348/52; 709/203
See application file for complete search history.

(56) References Cited

U.S. PATENT DOCUMENTS

| 6,501,441 | B1* | 12/2002 | Ludtke et al. ............... 345/1.1 |
| 7,019,737 | B1  | 3/2006  | Asai et al. |
| 7,196,677 | B2* | 3/2007  | Sato et al. .................. 345/1.3 |
| 7,523,046 | B2* | 4/2009  | Colalancia et al. ............. 705/9 |
| 7,711,681 | B2* | 5/2010  | Dempski et al. ............. 345/1.1 |
| 2002/0015003 | A1* | 2/2002  | Kato et al. .................. 345/1.1 |
| 2003/0151562 | A1* | 8/2003  | Kulas ........................ 345/1.1 |
| 2004/0046705 | A1  | 3/2004  | Masazumi et al. |
| 2004/0263424 | A1* | 12/2004 | Okuley ...................... 345/1.1 |
| 2005/0156814 | A1* | 7/2005  | Sato et al. .................. 345/1.3 |
| 2006/0077117 | A1* | 4/2006  | Okuley ...................... 345/1.1 |
| 2006/0092095 | A1* | 5/2006  | Ming-Daw et al. ........... 345/1.3 |
| 2007/0200791 | A1* | 8/2007  | Meyers ...................... 345/1.1 |
| 2009/0204265 | A1* | 8/2009  | Hackett ..................... 700/284 |

FOREIGN PATENT DOCUMENTS

| JP | 2004-29801 A | 1/2004 |
| JP | 2004-117406 A | 4/2004 |
| JP | 2005-24655 A | 1/2005 |

\* cited by examiner

Primary Examiner—Nitin Patel
(74) Attorney, Agent, or Firm—Sidley Austin LLP

(57) ABSTRACT

An image display system is provided that has a plurality of compact, easy to carry, and easy to use display devices. The image display system having the feature of transmitting image data and also supplying power successively for every prescribed number of display apparatuses from a host machine to a plurality of display devices provided with a reflection type display device having a memory effect.

14 Claims, 7 Drawing Sheets

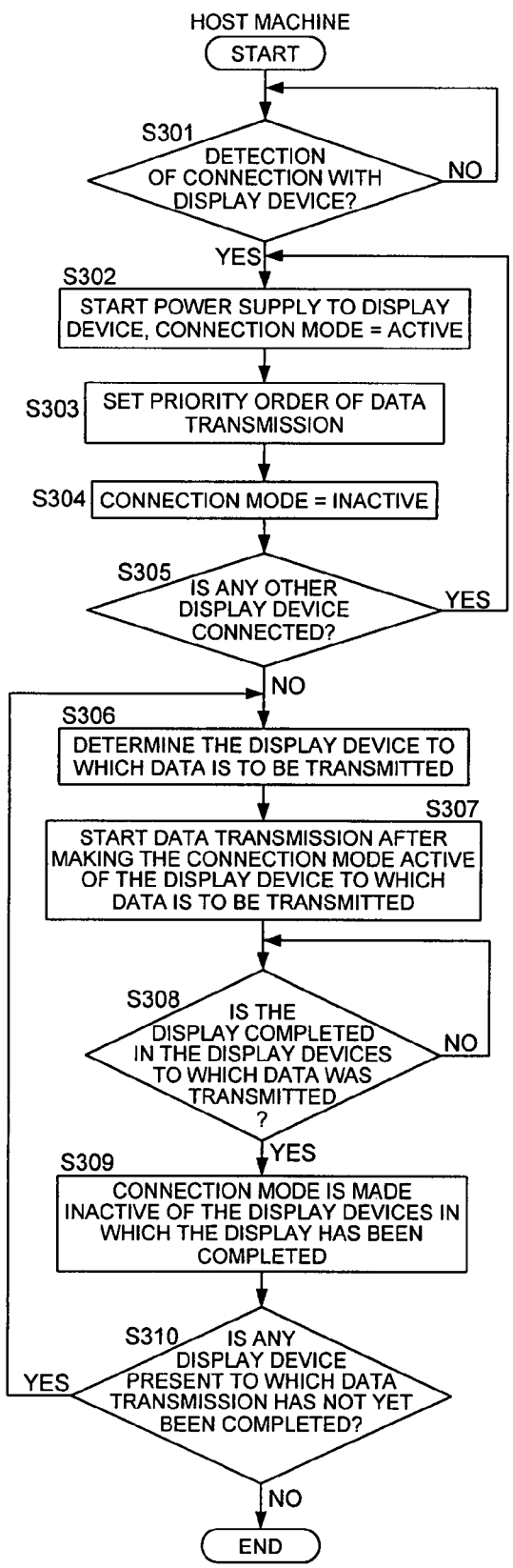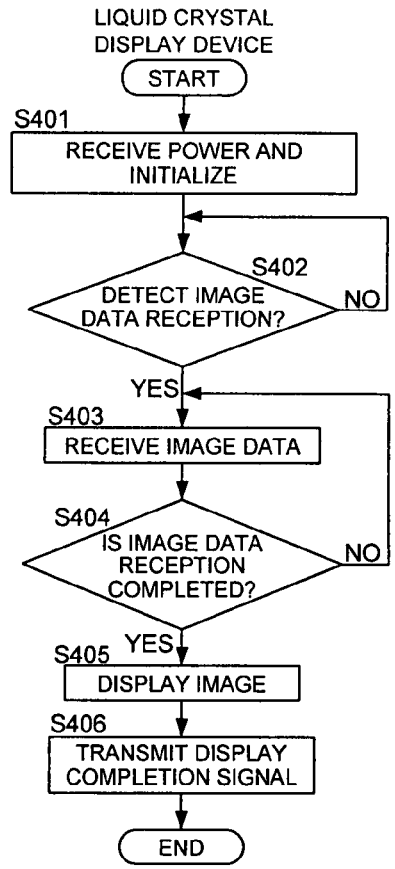
FIG. 7 a
FIG. 7 b

IMAGE DISPLAY SYSTEM, HOST MACHINE AND RECORDING MEDIUM FOR STORING PROGRAM

This application is based on Japanese Patent Application No. 2006-137509 filed on May 17, 2006, No. 2007-108005 filed on Apr. 17, 2007, in Japanese Patent Office, the entire content of which is hereby incorporated by reference.

TECHNICAL FIELD

The present invention relates to display systems provided with a display device that uses a reflective display element having memory effect, a host machine in the system and a computer readable recording medium storing a program.

BACKGROUND

In recent years, opportunities for making presentations of plans, proposals, estimates, etc., are increasing. For example, during sales activities, when visiting a customer, the sales discussions are made by explaining the product while displaying the documents in the display of a personal computer, and negotiating with the customer while displaying the different estimates that have been prepared. However, if several estimates are displayed simultaneously in the display, it becomes difficult to view them, but if they are displayed successively, it becomes difficult to compare the displayed estimate with the ones displayed previously. In addition, in a meeting, quite often the plans and proposals are displayed on a screen using a projector, and the presentation is made by distributing in advance to the members of the meeting paper documents corresponding to the screen displays. In this case, if there is any additional report or a sudden urgent topic to be discussed, it becomes necessary to prepare paper documents related to the additional report or urgent topic in the middle of the meeting, which disturbs the progress of the meeting.

In view of this, in order to carry out presentation smoothly without any obstruction to the meeting or sales discussion, it is possible to constitute the display screen using a reflection type liquid crystal display device having a memory effect as disclosed in Japanese Laid-Open Patent Publication No. 2004-117406, and distributing it to the customers or members of the meeting instead of paper documents.

However, although the display apparatus described in Japanese Laid-Open Patent Publication No. 2004-117406 has high power saving effect and is provided with good visibility, since it is provided with an operation panel that the user operates, a slot for inserting recording media, and a power supply, the customers or the members of the meeting will have to listen to the explanation while operating the display apparatus, it is not user-friendly.

Therefore, it is possible to think of a method in which the customers or the members of the meeting do not operate the display apparatus but the person making the presentation operates it using a host machine, thereby displaying images in the display apparatuses of the customers or of the members of the meeting. In particular, in such a case, it is necessary to display the images simultaneously in a plurality of display apparatuses, and a display system that is efficient and offers ease of use to the customers or the members of a meeting is desired.

SUMMARY

The present invention was made considering these problems, and the purpose of the present invention is to provide a display system provided with a plurality of display apparatuses that are compact, easy to carry, and convenient to use, and to provide a host machine in the system and a computer readable recording media storing a program. In view of forgoing, one embodiment according to one aspect of the present invention is an image display system, comprising:

a plurality of display devices, each of the display devices including;
 a reflective display element which has a memory effect,
 a data receiving section which is adapted to receive image data, and
 a driving circuit which causes the display element to display an image based on the image data received by the data receiving section; and
a host machine which is adapted to connect to the plurality of display devices, the host machine including;
 a memory section which is adapted to store image data,
 a data transmission section which is adapted to transmit the image data stored in the memory section to the data receiving section of each of the display devices,
 a power supply section which is adapted to supply electric power to the driving circuit of each of the display devices, and
 a control section which causes the data transmitting section and the power supply section to execute the transmission of the image data and the supply of electric power in a sequential manner for every predetermined number of the display devices.

According to another aspect of the present invention, another embodiment is a host machine which is adapted to connect to a plurality of display devices each of which includes a reflective display element which has a memory effect, the host machine comprising:

a memory section which is adapted to store image data;
a data transmitting section which is adapted to transmit the image data stored in the memory section to each of the display devices,
a power supply section which is adapted to supply electric power to each of the display devices; and
a control section which causes the data transmitting section and the power supply section to execute the transmission of the image data and the supply of electric power in a sequential manner for every predetermined number of the display devices.

According to another aspect of the present invention, another embodiment is a computer readable recording medium storing a program for making a computer connected to a plurality of display devices each of which includes a reflective display element having a memory effect, execute the steps of:

storing an image data in a memory section;
transmitting the image data stored in the memory section to each of the display devices;
supplying electric power to each of the display devices; and
controlling the transmission of the image data in the transmitting step and the supply of electric power in the supplying step to be executed in a sequential manner for every predetermined number of display devices.

BRIEF DESCRIPTION OF THE DRAWINGS

FIG. 7a is a flow chart showing the control procedure of the host machine according to a second preferred embodiment of the present invention.

FIG. 7b is a flow chart showing the control procedure of the display device according to a second preferred embodiment of the present invention.

DETAILED DESCRIPTION OF THE PREFERRED EMBODIMENT

Figure 1:
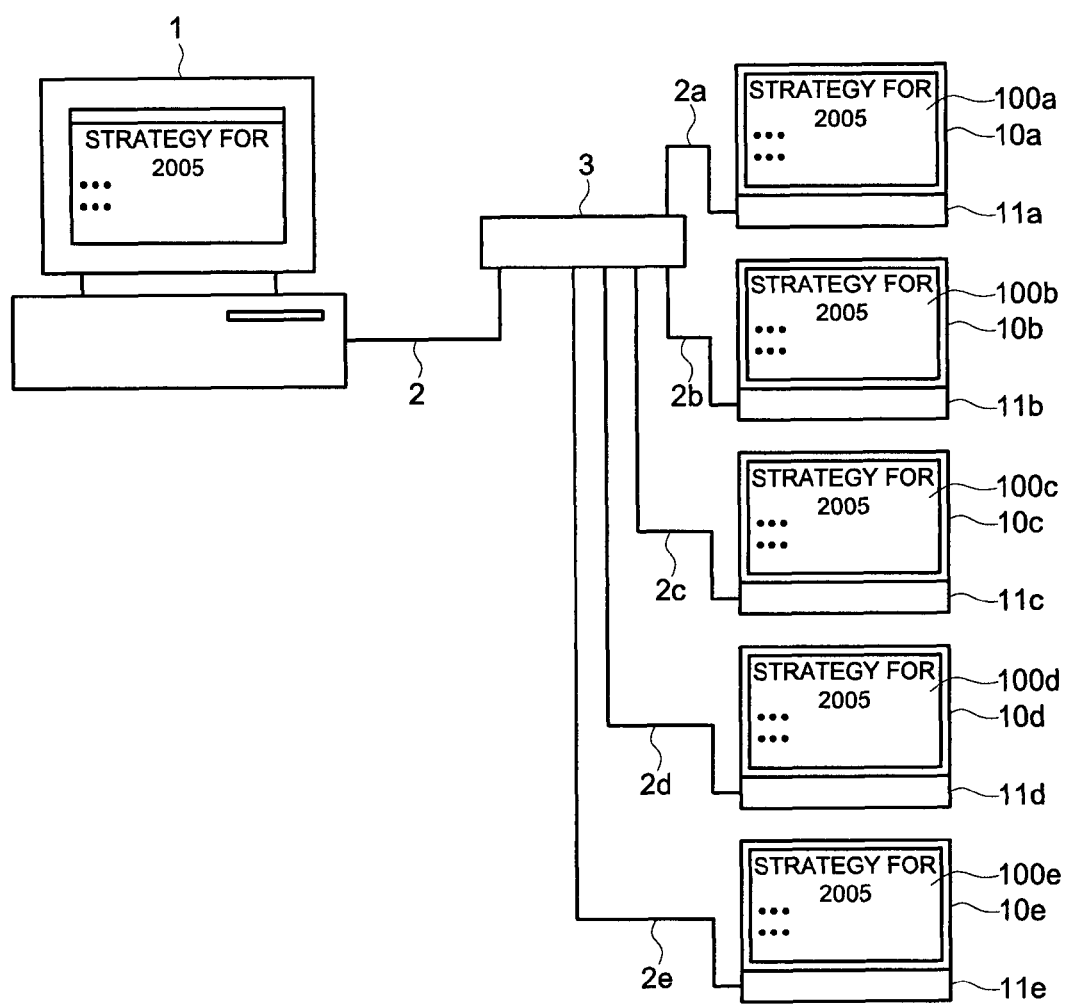
FIG. 1 is a schematic diagram of the image display system according to a first preferred embodiment of the present invention.

In the following, some preferred embodiments of the present invention are described while referring to the drawings. While the preferred embodiments of the present invention have been described using specific terms, such description is for illustrative purpose only, and it is to be understood that changes and variations may be made without departing from the spirit or scope of the appended claims. An external view diagram of an image display system which is a first preferred embodiment of the present invention is shown in FIG. 1. This liquid crystal display system is configured to have a host machine 1 made of a personal computer etc., a plurality of reflection type liquid crystal display devices 10a to 10e as display devices of the present invention each provided with a frame 11 that encloses a full color liquid crystal display element 100 and circuits described later that drive and control the liquid crystal display element 100, a USB cable 2 that electrically connected to the host machine 1, USB cables 2a to 2e that are electrically connected to the plurality of liquid crystal display devices 10a to 10e, and a USB hub 3 that connects the USB cable 2 with the USB cables 2a to 2e.

To begin with, in order to explain the basic operation of the liquid crystal display system according to a first preferred embodiment of the present invention, the host machine 1, one liquid crystal display device 10, the USB cable 2, and the USB hub 3 are described below referring to the block diagram in FIG. 2.

The host machine 1 is provided with a DC-DC converter 136 of the power distribution circuit function as the power supply section that supplies power to the different sections from the power supply 135 such as batteries or an AC-DC converter, etc., a ROM 57 that has stored in it different types of control programs and the maximum amount of power that can be supplied, a RAM 58 as the memory section that stores image data and stores temporarily various types of information, a central processing circuit 71, operation keys 22, a power switch 23, an insertion verification sensor 46, and transmission circuit 33 that transmits image data, etc. to the liquid crystal display device 10, and each of the signals from the operation keys 22, the power switch 23, and the insertion verification sensor 46 are input to the central processing circuit 71. The DC-DC converter 136 and the transmission circuit 33 respectively function as a power supply section and a transmitting section of the present invention.

The central processing circuit 71, the ROM 57, and the RAM 58 constitute the control circuits as a control section. The control circuits transmits the image data stored in the RAM 58 to the liquid crystal display device 10 from the transmission circuit 33, and also controls the switching ON and OFF the DC-DC converter 136 that supplies electric power to the circuits of the central processing-circuit 71, the liquid crystal display device 10, and other circuits.

The power switch 23 switches ON and OFF the operation of the central processing circuit 71, and the insertion verification sensor 46 sends a signal to the central processing circuit 71 when the USB cable 2 to be described later is connected between the host machine 1 and the liquid crystal display device 10.

The liquid crystal display device 10 is provided with a power supply circuit 137 that receives power supply of a prescribed specifications from the DC-DC converter 136 of the host machine 1 and supplies power to the display processing circuit 51 and the drive circuit 59, the receiving circuit 53 which is the data receiving section, a ROM storing the maximum amount of power consumption required for the display, a drive circuit 59 that drives the liquid crystal display element 100, an LCD controller 55 that controls the drive circuit, a liquid crystal display element 100 that has a memory effect for the written image, has a small thickness, and can be used in a paper-like manner, and a display processing circuit 51 that exchanges signals with the LCD controller 55, etc., and carries out image processing on the image data. The receiving circuit 53, as an informing section, transmits the maximum amount of power consumption stored in the ROM 4, and as a data receiving section, receives the image data from the transmission circuit 33 of the host machine 1, and transmits and receives the data such as various signals related to the image data.

The display processing section 51 controls the data reception by the receiving circuit 53, operates the drive circuit 59 in association with the LCD controller 55 and carries out drive control of the liquid crystal display element 100, temporarily stores the image data received from the host machine 1, and carries out the necessary image processing on the image data.

The USB cable 2, when the host machine 1 and the liquid crystal display device 10 are connected together via the USB hub 3, turns ON the insertion verification sensor 46 of the host machine 1, and makes possible the transmission and reception of data between the transmission circuit 33 and the receiving circuit 53. Further, it also enables the supply of power from the DC-DC converter 136 to the power supply circuit 137 of the liquid crystal display device 10. As the connection cable for carrying out transmission and reception of data and the supply of power, it is also possible to use an IEEE 1394 cable instead of a USB cable 2.

The host machine 1, when electrically connected with the liquid crystal display devices 10a to 10e via the USB hub 3 and the USB cables 2 and 2a to 2e, for each liquid crystal display device 10, makes the connection status active, supplies power, and inquires the amounts of maximum power required for display in each liquid crystal display device 10. Each of the liquid crystal display devices 10a to 10e, in response to that inquiry, returns the amount of maximum power consumption Wa to We stored in the ROM 54 to the host machine 1 from the receiving circuit 53. The host machine 1 that has received these responses makes the connection status inactive after receiving the response for each display apparatus. The host machine 1, via the USB cable 2 and the USB hub 3, determines the number of liquid crystal display devices to which power can be supplied simultaneously from the maximum amount of power that can be supplied and the values of the responses of the amounts of maximum power consumption Wa to We received from each of the liquid crystal display devices, and makes active each of the connections of every prescribed number of liquid crystal display devices, and executes power supply and transmission of image data in a sequential manner. When each of the prescribed number of liquid crystal display devices 10 that have been put in the active state receives power supply from the host machine 1 and receives the image data, it carries out image processing in the display processing circuit 51, drives the drive circuit 59 using the LCD controller 55, carries out drive control of the liquid crystal display element 100, and displays the image. When the display of the image is completed, the receiving circuit 53, as signal sending section, transmits the display completion signal from the liquid crystal display device 10 to the host machine 1. Upon receiving the display completion signal, the host machine 1 puts the connection with that liquid crystal display device 10 in the inactive state, and stops supplying power to it. After stopping the power supply to all the liquid crystal display devices 10 within the prescribed number in this manner, the host machine 1 puts the connection with a liquid crystal display device 10 that has not yet displayed within the next prescribed number of devices (all the devices when the number of devices is less than this prescribed number) in the active state, and carries out display in the step described above.

In this manner, by executing the transmission of image data by the data transmitting section of the host machine 1 and the supply of power by the power supply section successively for a prescribed number of display devices, since it is possible to carry out image display in a plurality of display devices so that the maximum amount of power that can be supplied by the host machine 1 is not exceeded, there is no possibility of the system becoming unstable because of insufficient power supply, and it is possible to display images efficiently in a large number of display devices.

Figure 3:
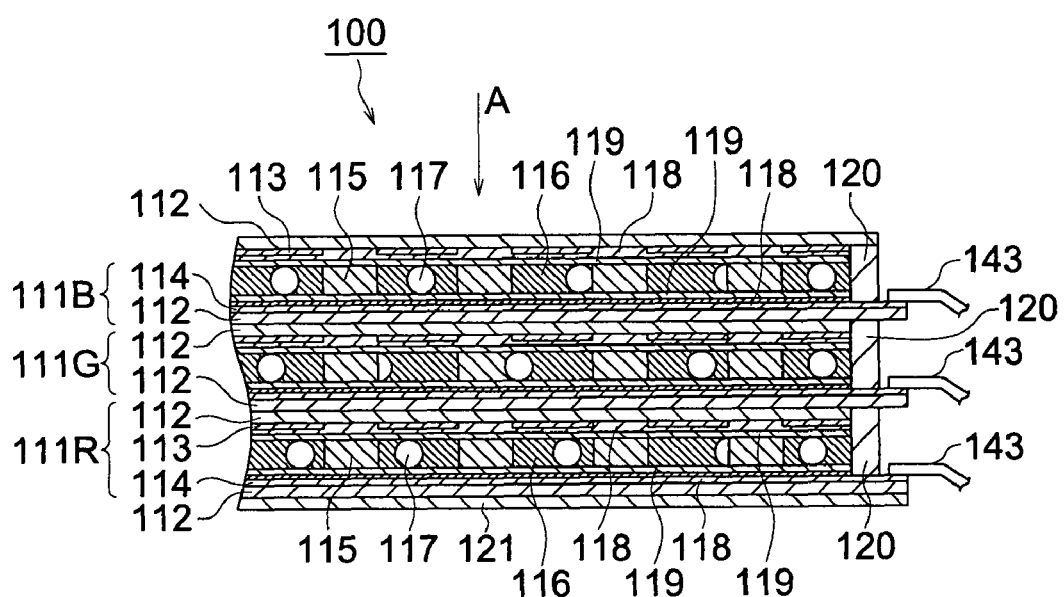
FIG. 3 is a cross-sectional view diagram of the liquid crystal display element used in the display device according to a first preferred embodiment of the present invention.

Next, the liquid crystal display element 100 incorporated into the liquid crystal display device 10 is described here referring to FIG. 3.

This liquid crystal display element 100 is one in which on top of a light absorption layer 121 is provided a red color display layer 111R which displays red color by switching between selective reflection and transparent states, on top of which is provided a green color display layer 111G which displays green color by switching between selective reflection and transparent states, and further on top of which is provided a blue color display layer 111B which displays blue color by switching between selective reflection and transparent states.

Each of the display layers 111R, 111G, and 111B is one in which plastic pillar structures 115, liquid crystal 116, and spacer 117 are held between transparent substrates 112 on which are formed respective transparent electrodes 113 and 114. If necessary, an insulating film 118 and an orientation control film 119 are provided on top of the transparent electrodes 113 and 114. In addition, on the outer periphery part of the substrate 112 (the part outside the display area) is provided a sealing material 120 for sealing the liquid crystal 116.

The transparent electrodes 113 and 114 are respectively connected to a flexible circuit board 143 and brought out, and prescribed pulse voltages are applied respectively to them from the drive control section. In response to that applied voltage, the liquid crystal 116 carries out switching of display between the transparent state of letting through visible light and the selective reflection state of selectively reflecting visible light of a particular wavelength.

The transparent electrodes 113 and 114 provided on each of the display layers 111R, 111G, and 111B are made of a plurality of band shaped electrodes arranged in parallel while maintaining respectively a very fine interval between them, the orientations of these band shaped electrodes are such that they are at right angles to each other. Electricity is supplied successively to these top and bottom electrodes. In other words, the display is made by applying voltage successively in the form of a matrix to the different liquid crystals 116. This is called matrix drive. This type of matrix drive is made either successively or simultaneously to each of the display layers thereby carrying out full color image display in the liquid crystal display element 100.

In more detailed terms, in a liquid crystal display device in which liquid crystals exhibiting cholesteric phase are held between two substrates, the display is made by changing the state of the liquid crystal between the planar state and the focal conic state. When the liquid crystals are in the planar state, if the helical pitch of the cholesteric liquid crystals is taken as P and the average refractive index of the liquid crystals is taken as n, then light with a wavelength of $\lambda=P \cdot n$ is reflected selectively. Further, in the focal conic state, the light is scattered when the selective reflection wavelength of the cholesteric liquid crystals is in the infrared region, or visible light is allowed to pass through if it is shorter than that. Therefore, by setting the selective reflection wavelength in the visible light region and by providing a light absorption layer on the side opposite to the viewing side of the device, it is possible to display the selective reflection color in the planar state and to display black color in the focal conic state. In addition, by setting the selective reflection wavelength in the infrared light region and by providing a light absorption layer on the side opposite to the viewing side of the device, it is possible to display black color in the planar state although light with a wavelength in the infrared region is reflected but visible light is allowed to pass through and to display white color in the focal conic state due to scattering of light.

Regarding color display, the liquid crystal display element 100 in which the different display layers of 111R, 111G, and 111B are superimposed on one another, when the blue display layer 111B and the green display layer 111G are in the transparent state of focal conic alignment of the liquid crystals and the red display layer 111R is in the selective reflection state of planar alignment of liquid crystals, it is possible to display red color. Also, when the blue display layer 111B is in the transparent state of focal conic alignment of the liquid crystals and the green display layer 111G and the red display layer 111R are in the selective reflection state of planar alignment of liquid crystals, it is possible to display yellow color. In a similar manner, by appropriately selecting between the transparent state and the selective reflection state of the different display layers, it is possible to display the colors of red, green, blue, white, cyan, magenta, yellow, and black. In addition, by selecting the intermediate selective reflection states of the different display layers of 111R, 11G, and 111B, it is possible to display intermediate colors, and hence it is possible to use this device as a full color display device.

Figure 4:
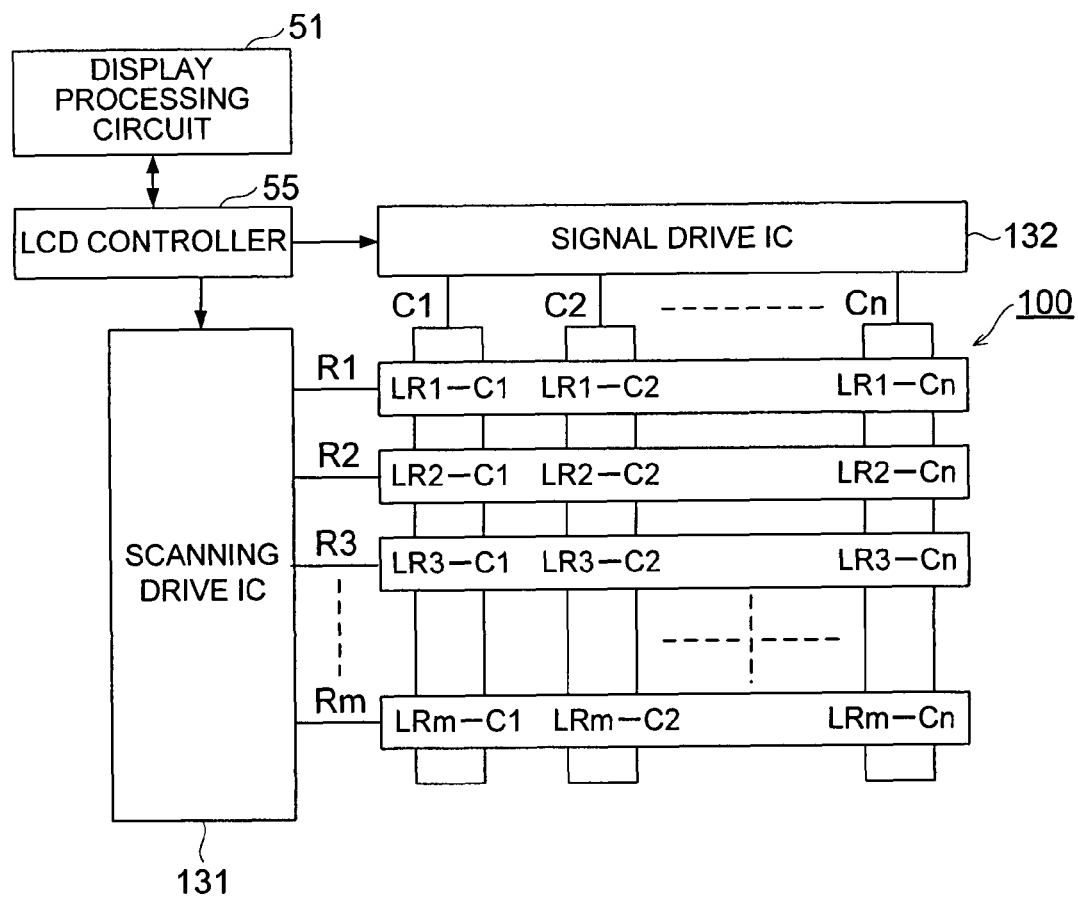
FIG. 4 is a block diagram showing the drive circuit of the display element according to a first preferred embodiment of the present invention.

Next, the drive control of the liquid crystal display element 100 is explained referring to FIG. 4.

The display processing circuit 51 carries out the required image processing on the temporarily stored image data, and based on this image data, the LCD controller 55 controls the drive circuit 59 made up of a scanning drive IC 131 and a signal drive IC 132 to apply voltages successively between each of the scanning electrodes and signal electrodes of the liquid crystal display element 100 thereby writing the image in the liquid crystal display element 100.

The pixel configuration of the liquid crystal display element 100 is expressed by a matrix respectively of several of the scanning electrodes R1, R2 to Rm and signal electrodes C1, C2 to Cn (where m and n are natural integers). The scanning electrodes R1, R2 to Rm are connected to the output terminals of the scanning drive IC 131 and the signal electrodes C1, C2 to Cn are connected to the output terminals of the signal drive IC 132.

The scanning drive IC 131, while putting in the selected state the prescribed ones among the scanning electrodes R1, R2 to Rm by outputting the selection signal to them, it outputs the non-selection signal to the remaining electrodes and puts them in the unselected state. The scanning drive IC 131 applies the selection signal successively to each of the scanning electrodes R1, R2 to Rm while changing the electrodes at a prescribed time interval. On the other hand, the signal drive IC 132, in order to rewrite each of the pixels on the scanning electrode R1, R2 to Rm in the selected state, simultaneously outputs signals corresponding to the image data to each of the signal electrodes C1, C2 to Cn. For example, when the scanning electrode Ra is selected (where a is a natural number satisfying the condition $a \leq m$), all the pixels at the intersecting points between this scanning electrode Ra and each of the signal electrodes C1, C2 to Cn, that is the pixels LRa-C1 to LRa-Cn are rewritten simultaneously. Because of this, the voltage difference between the scanning electrode and the signal electrode at each pixel becomes rewriting voltage of that pixel, and each of the pixels is rewritten according to this rewriting voltage.

Here, if the first threshold voltage for removing the twist of the liquid crystals exhibiting the cholesteric phase is taken as Vth1, after the voltage Vth1 has been applied for a sufficient interval of time, if the voltage is reduced to below the second threshold voltage Vth2 which is smaller than the first threshold voltage Vth1, the liquid crystals go into the planar state. Further, the state becomes focal conic state if a voltage higher than Vth2 but less than Vth1 is applied for a sufficient period of time. Both of these states are maintained in a stable manner even if the application of voltage is stopped. Further, by applying a voltage in the range from Vth1 to Vth2, it is possible to display intermediate gradations, that is, it is possible to display intermediate colors.

While it is possible to rewrite each of the pixels using the method described above, if an image is already being display, in order to eliminate the effect of this image, it is desirable to reset all the pixels to the same display state. This resetting can be done together for all the pixels or can be done for each scanning electrode. For example, when resetting each of the pixels to the focal conic state, it has become clear that a relatively long time interval is required in order to obtain a sufficiently transparent state. Therefore, it is desirable to reset all the pixels simultaneously to the focal conic state before rewriting because it is possible to reduce the rewriting time compared to resetting each scanning electrode.

Further, in the present preferred embodiment, while a liquid crystal display device having a reflection type liquid crystal element is used, it is not necessary to restrict to this, and for example, it is also possible to use a cell that includes two types of particles with different optical reflection density as has been indicated in Japanese Laid-Open Patent Publication No. 2001-215536, and it is possible to use a reflection type display device having a memory effect.

In the following, concrete explanation is given about the control procedure that the host machine 1 and the liquid crystal display device 10 process in the liquid crystal display system.

Figure 5:
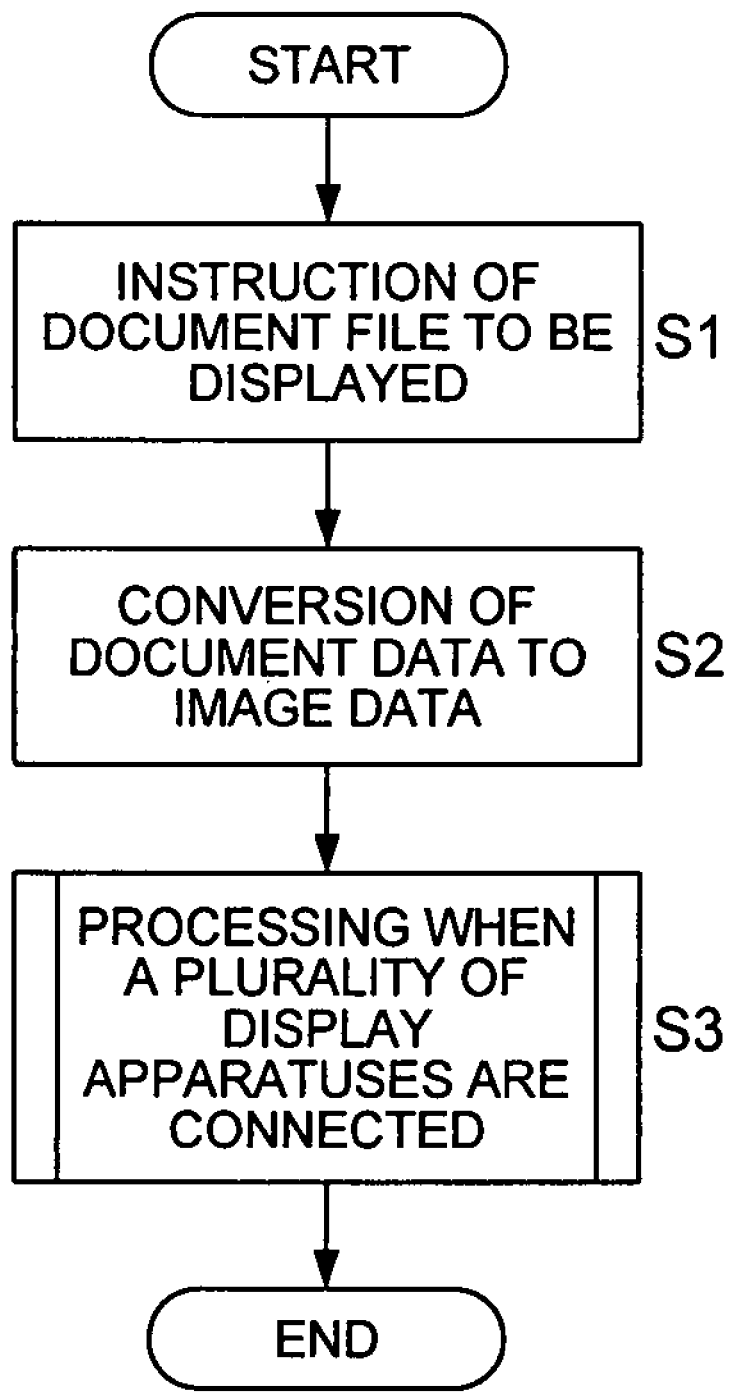
FIG. 5 is a flow chart showing the main routine of the control procedure of the host machine according to a first preferred embodiment of the present invention.

FIG. 5 shows the main routine of the central processing circuit 71. To begin with, the central processing circuit 71 starts up based on the switching ON of the power supply switch 23 shown in FIG. 2, the RAM 58 and the registers, etc. are initialized, and then the supply of power is started to the different sections connected to the central processing circuit 71. When in Step S1 the user selects the document file to be displayed in the different liquid crystal display devices 10 from among the files in the directory of in the window, and the document file is specified by the operation key 22, etc., in Step S2 the document data in the specified document file is converted into the format of image data. When a plurality of document data is present in the document file, each document data is converted into image data format, and is stored in the RAM 58. Next, in the subroutine in Step S3 the display processing at the time of connection with a plurality of liquid crystal display devices 10 is carried out.

Figure 6A:
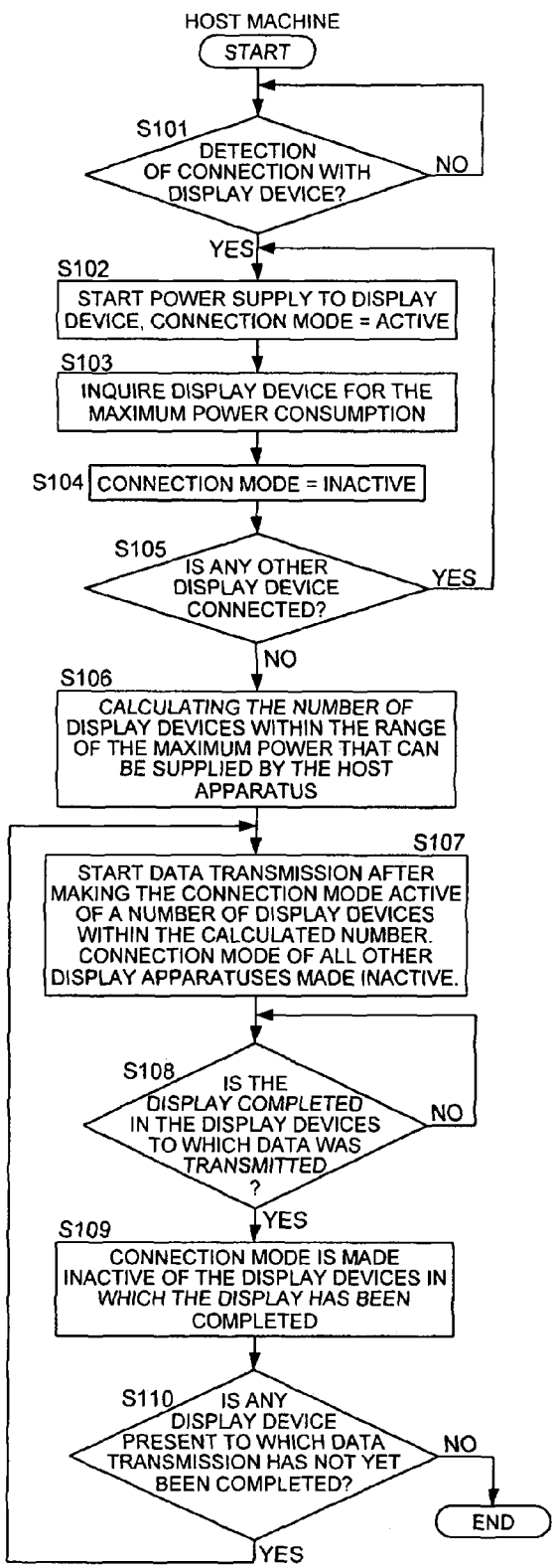
FIG. 6a is a flow chart showing the control procedure of the host machine according to a first preferred embodiment of the present invention.
Figure 6B:
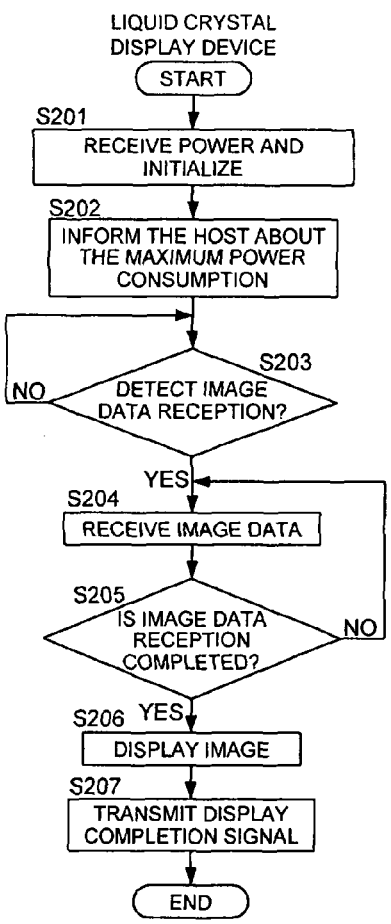
FIG. 6b is a flow chart showing the control procedure of the display device according to a first preferred embodiment of the present invention.

FIGS. 6*a* and 6*b* show flow charts of the control procedure of the display processing at the time of connection of the host machine 1 with a plurality of liquid crystal display devices 10. FIG. 6*a* shows the processing routine of the host machine 1 (corresponding to Step S3 in FIG. 5), and FIG. 6*b* shows the processing routine of each of the liquid crystal display devices 10, and here, the steps with numbers in the 100's correspond to the routine of the host machine 1 and the steps with numbers in the 200's correspond to the routine of the liquid crystal display devices 10.

In the following explanations, it is assumed that five liquid crystal display devices 10 are connected to the USB hub 3 as is shown in FIG. 1. Further, the maximum power W that can be supplied by the host machine 1 via USB hub 3, cable 2 and via the USB hub is 25 W, and the maximum power consumption Wn of each of the liquid crystal display devices 10 is 10 W. Also, the values of the number of liquid crystal display devices 10 that are connected to the USB hub 3, the maximum power W that can be supplied, or the maximum power consumption Wn are not limited to these values.

Firstly, on the side of the host machine 1, in Step S101, when the user connects the different liquid crystal display devices 10 via the USB cable 2, confirmation of each liquid crystal display device 10 being connected via USB cable 2 is made based on the signal from the insertion verification sensor 46. In Step S102 the DC-DC converter is turned ON, power is supplied to each liquid crystal display device 10, the connection mode is made active, and in Step S103 inquiry is made about the maximum power consumption Wn of each of the connected liquid crystal display devices 10. On the side of each liquid crystal display device 10, in Step S201 power supply from the host machine 1 is received via the USB cable 2 by the power supply circuit 137, the memory and the registers are initialized, in Step S202, the maximum power consumption Wn stored in the ROM 54 is informed to the host machine 1. On the side of the host machine 1, after receiving the maximum power consumption Wn, in Step S104, the connection mode with the liquid crystal display device 10 is made inactive. Since the inquiry of the maximum power supply Wn to each of the liquid crystal display devices has smaller power consumption in the liquid crystal display device as compared to that during writing an image to the liquid crystal display device 10, the inquiry can be made simultaneously to five apparatuses. Further, if there is any liquid crystal display device 10 that is connected newly in the middle of an inquiry in progress, in Step S105, a judgment is made as to whether or not there is any other connected liquid crystal display device 10, the maximum power consumption Wn is received after going back again to Step S102. If there are no other connected liquid crystal display device 10, the operation proceeds to Step S106. In Step S106, the amount of maximum power W that can be supplied by the host machine 1 is compared with the maximum power consumption Wn for each liquid crystal display device 10, the number of liquid crystal display devices that can be connected simultaneously is calculated. In this case, it is judged that a maximum of two liquid crystal display devices 10 can be connected simultaneously. In the next Step S107, the connection mode is made active for a number of liquid crystal display devices 10 equal to or less than the maximum number that can be connected. In this case, the connection mode of two units is made active, and the connection mode of the remaining three units is made inactive.

The host machine 1 transmits the image data in RAM 58 from the data transmission circuit 33 and then outputs the transmission completion signal. On the side of the two liquid crystal display devices 10, in Step S203, the reception of image data is detected, and if the detection of reception is present, in Step S204 the LCD controller 55 and the drive circuit 59 are put in the operating state thereby entering the state in which writing to the liquid crystal display device 10 is possible, and the image data is received. The two liquid crystal display devices 10 that have received the image data proceed to Step S205. In Step S205, a judgment is made as to whether or not the reception of the image data is completed, and if it has been completed, the operation proceeds to Step S206. In Step S206, image processing of the image data is carried out by the display processing circuit 51, drive control of the drive circuit 59 is made using the LCD controller 55, and the image is displayed on the liquid crystal display device 10. When the image display ends in Step S206, the operation proceeds to the next step S207. In Step S207, the display completion signal is transmitted to the host machine 1. In the host machine 1, when the display completion signal is received from the two liquid crystal display devices 10 in Step S108, in Step S109, the connection mode is made inactive for the two liquid crystal display devices 10 in which the display has been completed. Next, in Step S110, a judgment is made as to whether there are any liquid crystal display devices 10 to which image data has not yet been sent. Next, since there are three liquid crystal display devices 10 which are still in the non-displaying state, the operation returns to Step S107. In Step S107, two units are selected among the liquid crystal display devices 10 to which image data has not been sent, the connection mode of these two liquid crystal display devices 10 is made active, and by carrying out the operations up to Step S110, the image is displayed in these two liquid crystal display devices 10. The state and the transfer state of the connection between the host machine 1 and the five liquid crystal display devices 10 at this time are shown in Table 1. Two liquid crystal display devices 10 are in the display completion state, two other liquid crystal display devices 10 are in the middle of data transfer, and the remaining one unit is in a state in which data has yet to be transferred to it.

TABLE 1

|  | Liquid crystal display device | | | | |
| --- | --- | --- | --- | --- | --- |
|  | 10a | 10b | 10c | 10d | 10e |
| Maximum power consumption (W) | 10 | 10 | 10 | 10 | 10 |
| Connection mode | Inactive | Inactive | Active | Active | Inactive |
| Transfer/ display state | Display completed | Display completed | Being transferred | Being transferred | Not transferred |

Next, the operation returns to Step S107, and the image will displayed in the remaining liquid crystal display device 10. In this manner, the image is displayed on all the five liquid crystal display devices 10.

In the above manner, by the host machine 1 carrying out transmission of image data and supply of power to each of the prescribed number of liquid crystal display devices 10 that can be connected and by successively displaying the image in the prescribed number of liquid crystal display devices 10, it is possible to prevent the power consumption from becoming large due to the power supply from the host machine 1 being made simultaneously to many display apparatuses which would cause the operation to become unstable.

Further, when the connection mode is in the inactive state, although the power supply to the liquid crystal display device 10 is stopped, it is also possible to go into the power saving mode by making small the power supplied to the liquid crystal display devices 10 from the DC-DC converter 136.

Further, it is also possible to store the driver software for the LCD controller in an external storage device, loading that driver software in the host machine 1 and storing it in the RAM 58, and to carry out drive control of the drive circuit 59 from the host machine 1. In that case, when the USB cable 2 is detached from the host machine 1, the driver software is deleted from the host machine 1.

In this manner, the five liquid crystal display devices 10 in which the document data converted into an image is displayed are detached from the USB hub 3 and they are distributed to the members of the meeting. The members of the meeting can view the document data displayed on a screen using a projector, etc., and the corresponding document data displayed on the liquid crystal display device 10. In order to display several sheets of document data instead of displaying one sheet of document data in a plurality of liquid crystal display devices 10, it is possible to save several sheets of document data converted into images in the host machine 1, and to display them in each of the liquid crystal display devices 10. Further, when additional document data becomes necessary in the middle of a meeting, it is possible to prepare new liquid crystal display devices 10 and to display on them, and also, it is possible to place connectors such as USB connectors connected with the host machine 1 in the seating locations of the members of the meeting, and host machine can update the data in the liquid crystal display devices 10 whose reporting has been completed with the additional data via the connected cable.

As a second preferred embodiment, a display system in which a plurality of liquid crystal display devices 10 are connected to a host machine 1 and the display is made in sequential manner for every individual device of these devices is described here referring to FIGS. 7a and 7b. The method of connecting the plurality of liquid crystal display devices 10 with the host machine 1 is similar to the first preferred embodiment using USB cable 2 and USB hub 3.

Figure 2:
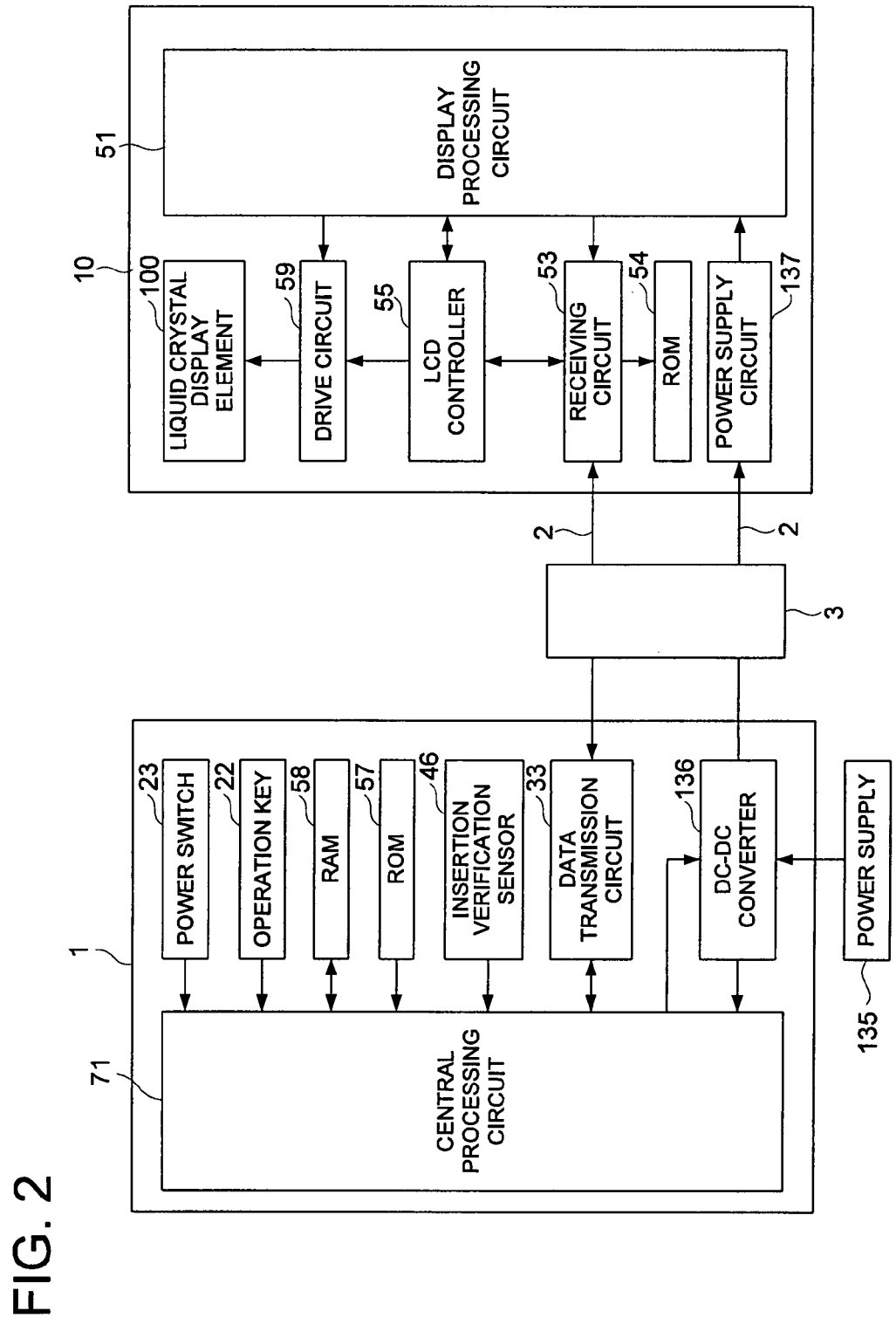
FIG. 2 is a block diagram showing the electrical configuration of the image display system according to a first preferred embodiment of the present invention.

Further, the block diagrams of the host machine 1, each of the liquid crystal display devices 10, the USB cable 2, and the USB hub 3 of the display system are the same as in FIG. 2 of the first embodiment except that the ROM 54 is omitted. In the second preferred embodiment, since the display is made successively in one liquid crystal display device 10 at a time, there is no need to request for the maximum power consumption Wn as in the first preferred embodiment, and the ROM 54 in the block diagram of FIG. 2 becomes unnecessary. Since the main flow chart of the host machine 1 is the same as in the first preferred embodiment, its description is omitted here. Further, in the following explanations, like numbers are assigned to the members with like functions as in the first preferred embodiment, and duplicated explanations are omitted.

In FIGS. 7a and 7b are shown the flow charts of the control procedure when three display apparatuses 10a, 10b, and 10c are connected to the USB hub 3, and the display is made in one apparatus at a time.

FIG. 7a shows the processing routine of the host machine 1 (corresponding to Step S3 in FIG. 5), and FIG. 7b shows the processing routine of each of the liquid crystal display devices 10a, 10b, and 10c, and here, the steps with numbers in the 300's correspond to the routine of the host machine 1 and the steps with numbers in the 400's correspond to the routine of the liquid crystal display devices 10a, 10b, and 10c.

Firstly, on the side of the host machine 1, in Step S301, when the user connects each of the different liquid crystal display devices 10 via the USB cable 2, confirmation of each liquid crystal display device 10 being connected via USB cable 2 is made based on the signal from the insertion verification sensor 46. In Step S302 the DC-DC converter is turned ON, power is supplied to each liquid crystal display device 10, the connection mode is made active, and in Step S303 the priority order is set of transmitting image data to each of the connected liquid crystal display devices 10. Next, in Step S304, the connection mode with each of the liquid crystal display devices 10 is made inactive. On the side of each liquid crystal display device 10, in Step S401 power supply from the host machine 1 is received via the USB cable 2 by the power supply circuit 137, and the memory and the registers are initialized.

On the side of the host machine 1, in Step S305, a judgment is made as to whether or not there is any other connected liquid crystal display device 10, and the operation goes back again to Step S302 if one is present. The operation proceeds to Step S306 if there is no other connected liquid crystal display device 10. In Steps S306, the liquid crystal display device 10 to which image data is to be transmitted is determined based on the set priority order, and the operation proceeds to Step S307. In Step S307, the connection mode with the determined liquid crystal display device 10 is made active, the image data in the RAM 58 is transmitted from the data transmission circuit 33, and then the transmission completion signal is output.

On the side of the liquid crystal display device 10, in Step S402, the reception of the image data is detected, if there is a reception detection, in the Step S403, the LCD controller 55 and the drive circuit 59 are put in the operating state thereby putting the liquid crystal display device 10 in a state in which data can be written to it, and the image data is received. The operation in the liquid crystal display device 10 that has received the image data proceeds to Step S404. In Step S404, a judgment is made as to whether or not the reception of the image data is completed, and if it has been completed, the operation proceeds to Step S405. In Step S405, image processing of the image data is carried out by the display processing circuit 51, drive control of the drive circuit 59 is made using the LCD controller 55, and the image is displayed in the liquid crystal display device 10. When the image display ends in Step S405, the operation proceeds to the next Step S406. In Step S406, the display completion signal is transmitted to the host machine 1.

In the host machine 1, when the display completion signal is received from the liquid crystal display device 10 in Step S308, in Step S309 the connection mode is made inactive for the liquid crystal display device 10 in which the display has been completed. Next, in Step S310, a judgment is made as to whether there is any liquid crystal display device 10 to which image data has not yet been sent. The operation goes back to Step S306 if such an device is present. In Step S306, the liquid crystal display device 10 to which data is to be transmitted next is selected from among the liquid crystal display devices 10 which are still in the non-displaying state based on the priority order that has been set, the connection mode of this liquid crystal display device 10 is made active, and by carrying out the operations up to Step S310, the image is displayed in this liquid crystal display device 10.

In this manner, the operations are repeated until there is no liquid crystal display device 10 to which image data has not been sent, and the image display is completed in the three liquid crystal display devices 10a, 10b, and 10c.

In this manner, the three liquid crystal display devices 10a, 10b, and 10c in which the document data converted into an image is displayed are detached from the USB hub 3 and they are distributed to the members of the meeting, and it is possible for the members of the meeting to view the document data displayed on a screen using a projector, etc., and the corresponding document data displayed in the liquid crystal display devices 10a, 10b, and 10c. In order to display several sheets of document data instead of displaying one sheet of document data in a plurality of liquid crystal display devices 10, it is possible to save several sheets of document data converted into images in the host machine 1, and to write each of them on each of the liquid crystal display devices 10. Further, when additional document data becomes necessary in the middle of a meeting, it is possible to prepare new liquid crystal display devices 10 and to display on them, and also, it is possible to place connectors such as USB connectors connected with the host machine 1 in the seating locations of the members of the meeting, and host machine can update the data on the liquid crystal display devices 10 whose reporting has been finished with the additional data via the connected cable.

In the liquid crystal display system according to the present preferred embodiment, since, from a host machine 1 storing image data, that image data is transmitted and also power is supplied via a cable such as a USB cable 2 to a liquid crystal display device 10 provided with a reflection type display element 100 having a memory effect, there is no need for a power supply such as batteries in the liquid crystal display devices 10, the liquid crystal display devices 10 become small in size, and also, it is easily possible to carry the liquid crystal display devices 10 with the cable detached, and it is possible to view the image at any time and at any place.

Further, by confirming that the image has been displayed on a liquid crystal display device 10 based on the transmission completion signal generated when the image data is transmitted from the host machine 1 to a liquid crystal display device 10 and the display completion signal input when the liquid crystal display device 10 displays the image data, and by putting the power supply circuit 137 of the liquid crystal display device 10 in the non-operating state, it is possible to transmit without fail the image data from the host machine to the liquid crystal display device 10. In addition, in the case of transmitting to a plurality of liquid crystal display devices 10, it is also possible to prevent wrong operations of transmitting to a different liquid crystal display device 10 by mistake.

Further, by connecting a plurality of liquid crystal display devices 10 to the host machine 1 through a cable such as a USB cable 2, and by carrying out transmission and reception of image data and signals via the cable and also supplying power, it is possible to reduce the number of connection cables that connect the plurality of liquid crystal display devices 10 with the host machine 1 and thus reduce the space requirement.

In addition, when transmitting image data to a plurality of liquid crystal display devices 10, by transmitting the data and supplying power for every prescribed number of liquid crystal display devices 10 so that the power supplied to the liquid crystal display devices 10 do not exceed the available maximum power of the host machine 1, it is possible to carry out power supply to the host machine in a stable manner, and it is possible to display image in a plurality of liquid crystal display devices 10 efficiently.

According to the present preferred embodiment, by transmitting image data and also supplying power successively for every prescribed number of display apparatuses from a host machine to a plurality of display devices provided with a reflection type display element having a memory effect, it is possible to provide a display system having a plurality of compact, easy to carry, and easy to use display devices.

What is claimed is:

1. An image display system, comprising:
   a plurality of display devices, each of the display devices including;
      a reflective display element which has a memory effect,
      a data receiving section which is adapted to receive image data, and
      a driving circuit which causes the display element to display an image based on the image data received by the data receiving section; and
   a host machine which is adapted to connect to the plurality of display devices, the host machine including;
      a memory section which is adapted to store image data,
      a data transmission section which is adapted to transmit the image data stored in the memory section to the data receiving section of each of the display devices,
      a power supply section which is adapted to supply electric power to the driving circuit of each of the display devices, and
      a control section which causes the data transmitting section and the power supply section to execute the transmission of the image data and the supply of electric power in a sequential manner for every predetermined number of the display devices.

2. The image display system of claim 1, wherein the control section causes the data transmitting section and the power supply section to execute the transmission of the image data and the supply of electric power in a sequential manner for every individual display device.

3. The image display system of claim 1, wherein each of the display devices comprises an informing section which is adapted to inform a value of power consumption needed for the display device to display an image to the host machine,
   wherein the control section causes the data transmitting section and the power supply section to execute the transmission of the image data and the supply of electric power in a sequential manner for every predetermined number of the display devices so that a summation value of the value of the power consumption of each of the display devices does not exceed a predetermined value.

4. The image display system of claim 1, wherein each of the display devices comprises a signal sending section which sends a display completion signal to the host machine when the display device completes displaying the image,
   wherein the control section, in response to the display completion signal from each of the display devices, puts the power supply of the power supply section to the display device, from which the display completion signal has been received, into an inoperative condition.

5. The image display system of claim 1, wherein each of the display devices is connected to the host machine though a USB cable.

6. The display system of claim 1, wherein the display device includes a cholesteric liquid crystal display element.

7. A host machine which is adapted to connect to a plurality of display devices each of which includes a reflective display element which has a memory effect, the host machine comprising:
   a memory section which is adapted to store image data;
   a data transmitting section which is adapted to transmit the image data stored in the memory section to each of the display devices,
   a power supply section which is adapted to supply electric power to each of the display devices; and
   a control section which causes the data transmitting section and the power supply section to execute the transmission of the image data and the supply of electric power in a sequential manner for every predetermined number of the display devices.

8. The host machine of claim 7, wherein the control section causes the data transmitting section and the power supply section to execute the transmission of the image data and the supply of electric power in a sequential manner for every individual display device.

9. The host machine of claim 7, wherein the control section causes the data transmitting section and the power supply section to execute the transmission of the image data and the supply of electric power in a sequential manner for every predetermined number of the display devices so that a summation value of electric power consumption of each of the display devices does not exceed a predetermined value.

10. The host machine of claim 7, wherein the control section, in response to receiving a display completion signal transmitted from each of the display devices, puts the power supply of the power supply section to the display device, from which the display completion signal has been received, into an inoperative condition.

11. A computer readable recording medium storing a program for making a computer connected to a plurality of display devices each of which includes a reflective display element having a memory effect, execute the steps of:
   storing an image data in a memory section;
   transmitting the image data stored in the memory section to each of the display devices;
   supplying electric power to each of the display devices; and
   controlling the transmission of the image data in the transmitting step and the supply of electric power in the supplying step to be executed in a sequential manner for every predetermined number of display devices.

12. The recording medium of claim 11, wherein the control step controls the transmission of the image data in the transmitting step and the supply of electric power in the supplying step to be executed in a sequential manner for every individual display device.

13. The recording medium of claim 11, wherein the controlling step controls the transmission of the image data in the transmitting step and the supply of electric power in the supplying step to be executed in a sequential manner for every predetermined number of the display devices so that a summation value of electric power consumption of each of the display devices does not exceed a predetermined value.

14. The recording medium of claim 11, wherein the control step, in response to receiving a display completion signal transmitted from each of the display devices, stops the supply of electric power in the supplying step to the display device from which the display completion signal has been received.

* * * * *